Patented Jan. 1, 1946

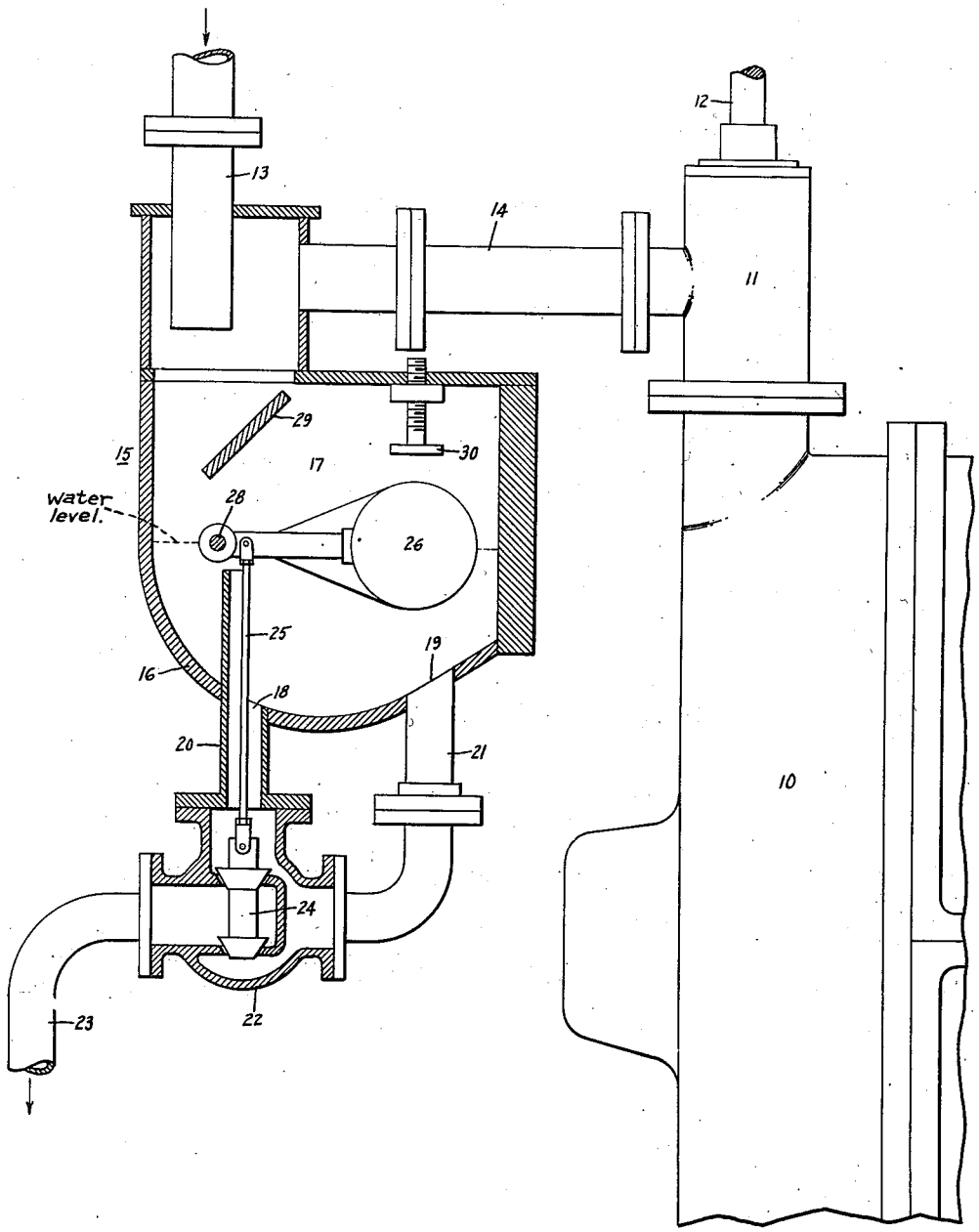

2,392,126

UNITED STATES PATENT OFFICE 2,392,126

LIQUID SEPARATOR FOR ELASTIC FLUID TURBINES

Edgar D. Dickinson, Beverly, Mass., assignor to General Electric Company, a corporation of New York Application November 10, 1943, Serial No. 509,693

2 Claims. (Cl. 183—42)

The present invention relates to elastic fluid turbine arrangements including means for removing water or condensate from the steam or like elastic fluid before it enters the turbine. In certain applications, especially in marine installations due to the peculiar arrangement and operation of marine boilers, considerable slugs of water or like liquid may be carried from the boiler through the piping system feeding the turbine. The slugs of water when admitted to the turbine may injure the turbine blading and have other injurious results on the operation of the turbine. Water slugs in the turbine produce a considerable thrust load requiring the provision of special thrust bearing arrangements. In certain instances the slugs are of such a volume and occur at such a rate that ordinary steam traps or condensate removal devices do not adequately prevent water from entering the turbine.

The object of my invention is the provision of an improved construction of turbine arrangements whereby the aforementioned drawbacks are overcome and water slugs are effectively removed from the elastic fluid before it enters the turbine.

For a consideration of what I believe to be novel and my invention, attention is directed to the following description and the claims appended thereto in connection with the accompanying drawing.

The single figure of the drawing illustrates a turbine arrangement embodying my invention.

The arrangement comprises an elastic fluid turbine 10 having an inlet chest 11 with valve means 12 for controlling the flow of elastic fluid to the turbine. A piping system for conducting elastic fluid from a source, not shown, to the inlet chest 11 includes a conduit section 13 and another section 14 connected in series by means of a liquid vapor separating device or liquid slug removal arrangement 15. This device has a vessel 16 connected to receive fluid from the conduit section 13 and having a discharge opening connected to conduct fluid through the conduit section 14 to the turbine. The conduit sections 13, 14 are arranged at right angles and the section 13 extends beyond the horizontal centerline of the section 14. Both conduit sections are connected to an upper reduced portion of the vessel 16. The lower portion of the vessel forms a chamber 17 with two discharge or drain openings 18, 19 connected by conduits 20, 21 respectively to a valve 22 having a drain conduit 23. The valve 22 has a movable valve member 24 connected by a link 25 to a float 26 located in the chamber 17 and pivotally supported on a fulcrum 28. Upon counterclockwise turning movement the float 26 opens the valve 24, permitting discharge of fluid from the chamber 17. A baffle or deflector vane 29 is located in the chamber 17 below the conduit section 13 and inclined towards the centerline thereof. The link 25 of the float 26 is disposed within the conduit 20, thus eliminating the necessity for providing special packing means for the link 25. The left-hand portion of the conduit 20 extends into the vessel to protect the link 25 from the impact of water slugs during operation. Opening movement of the valve 24 is limited by the provision of an adjustable stop 30 cooperatively associated with the float 26 and secured to the wall of the vessel 16.

During operation elastic fluid entering the device through the conduit section 13 is deflected by the deflector 29 and discharged from the device through the conduit section 14 to the turbine. Water or other liquid slugs carried through the conduit section 13 into the chamber 17 follow the outer wall of the device which has a curved bottom portion and strikes the float 26 with considerable impact. The baffle or deflector 29, as pointed out above, protects the upper surface of the float from direct impact by water slugs and also assists in guiding the slugs along the outer wall of the chamber 17. The impact of the water causes the float 26 to rise suddenly and to open quickly the valve 24, permitting the water to be forced out through the conduits 20, 21. The valve 24 is held open until the water has reached its lower level determined by the buoyant effect of the float 26. In case small water slugs are carried into the chamber 17 they will cause a gradual rise of the water level therein until the float 26 effects opening of the drain valve 24.

Having described the method of operation of my invention, together with the apparatus which I now consider to represent the best embodiment thereof, I wish to have it understood that the apparatus shown is only illustrative and that the invention may be carried out by other means.

What I claim as new and desire to secure by Letters Patent of the United States is:

1. Elastic fluid turbine arrangement comprising a turbine having an inlet, and a piping system for conducting elastic fluid to the inlet including two conduit sections and a liquid slug removal device having a chamber connecting the sections in series, the sections being arranged at right angles and one section extending into the chamber beyond the centerline of the other section, the chamber having a curved wall, a deflector in the chamber for directing water slugs discharged into the chamber towards the curved wall, valved conduit means connected to the chamber for draining liquid therefrom, and a float connected to the valved conduit means and disposed in the chamber responsive to the liquid level therein and to the rate of flow of liquid slugs to the chamber.

2. Device for removing liquid slugs from elastic fluid comprising a vessel having a curved bottom portion, a supply conduit and an elastic fluid discharge conduit arranged at right angles and connected to a top portion of the vessel, the supply conduit extending beyond the centerline of the discharge conduit, a deflector for directing liquid slugs discharged from the supply conduit substantially tangentially towards and along the curved bottom portion, two drain conduits connected to the bottom portion, a valve for controlling the flow through the drain conduits, and means for positioning the valve comprising a float with a bottom subject to the impact of fluid discharged towards the curved bottom portion, said float being pivotally disposed within the vessel and responsive to changes of the liquid level in the vessel and to the rate of flow of liquid slugs thereto and a link connecting the float to the valve and disposed within one of the drain conduits.

EDGAR D. DICKINSON.